(12) United States Patent
Dong et al.

(10) Patent No.: US 11,294,264 B2
(45) Date of Patent: Apr. 5, 2022

(54) CAMERA SYSTEM AND MOBILE TERMINAL USING SAME

(71) Applicant: AAC Technologies Pte. Ltd., Singapore (SG)

(72) Inventors: Leping Dong, Shenzhen (CN); Suohe Wei, Shenzhen (CN); Tianheng Ni, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 0 days.

(21) Appl. No.: 16/986,290

(22) Filed: Aug. 6, 2020

(65) Prior Publication Data
US 2020/0401021 A1 Dec. 24, 2020

Related U.S. Application Data

(63) Continuation of application No. PCT/CN2019/091915, filed on Jun. 19, 2019.

(51) Int. Cl.
| | | |
|---|---|---|
| *G03B 17/56* | (2021.01) | |
| *H04M 1/02* | (2006.01) | |
| *G03B 17/04* | (2021.01) | |

(52) U.S. Cl.
CPC .......... *G03B 17/561* (2013.01); *G03B 17/04* (2013.01); *H04M 1/0264* (2013.01)

(58) Field of Classification Search
CPC .... G03B 17/561; G03B 17/04; H04N 5/2251; H04N 5/2257; H04M 1/0264
See application file for complete search history.

(56) References Cited

U.S. PATENT DOCUMENTS

| | | | | |
|---|---|---|---|---|
| 2019/0014201 A1* | 1/2019 | Bao | ..................... | H04N 5/23238 |
| 2020/0344338 A1* | 10/2020 | Yang | ................ | H04N 5/225251 |

FOREIGN PATENT DOCUMENTS

| | | | | | |
|---|---|---|---|---|---|
| CN | 107888809 A | * | 4/2018 | .......... | H04M 1/0264 |
| CN | 109495677 B | * | 3/2019 | .......... | H04M 1/0264 |
| CN | 110035213 A | * | 7/2019 | .......... | H04M 1/0264 |
| WO | WO-2020015559 A1 | * | 1/2020 | ........... | H04N 5/2251 |

* cited by examiner

*Primary Examiner* — Christopher E Mahoney
(74) *Attorney, Agent, or Firm* — W&C Law Group

(57) ABSTRACT

The invention provides a camera system, including: a supporting base; a rotary driving module for outputting rotary power, including a first driving unit and a driving shaft connected to an output of the first driving unit for being driven by the first driving unit; a camera module, connected to the driving shaft for being driven by the driving shaft to rotate around a central axis of the driving shaft; a mobile driving module including a second driving unit and a driving member connected to the second driving unit. The supporting base is connected to the driving member away from an end part of the camera module. The second driving unit drives the driving member to move, so that the driving member drives the supporting base, the rotary driving module, and the camera module to reciprocate in a direction parallel to the central axis of the driving shaft.

12 Claims, 9 Drawing Sheets

CAMERA SYSTEM AND MOBILE TERMINAL USING SAME

FIELD OF THE PRESENT DISCLOSURE

The invention relates to the technical field of photographing equipment, and more particularly to a camera system and a mobile terminal using such a camera system.

DESCRIPTION OF RELATED ART

With the advent of the Internet era, the number of smart electronic products continues to rise. The functions of smart electronic products are rich and diverse and are deeply loved by users. One of them is the shooting function. Therefore, the camera system used for shooting is widely used in smart electronic products.

In order to meet the needs of users, the camera system usually includes a front camera and a rear camera. The rear camera is directly fixed on the back of the smart electronic product and exposed. The front camera needs to be installed in the non-display area on the front of the smart electronic product. The appearance of smart electronic products is not adjustable and its position cannot be adjusted, which is inconvenient for the users to use.

SUMMARY OF THE INVENTION

One of the major objects of the invention is to provide a camera system which is capable of rotating, expanding and contracting.

Thus, the invention provides a camera system, including: a supporting base; a rotary driving module for outputting rotary power, including a first driving unit and a driving shaft connected to an output of the first driving unit for being driven by the first driving unit; a camera module, connected to the driving shaft for being driven by the driving shaft to rotate around a central axis of the driving shaft; a mobile driving module including a second driving unit and a driving member connected to the second driving unit. The supporting base is connected to the driving member away from an end part of the camera module. The second driving unit drives the driving member to move, so that the driving member drives the supporting base, the rotary driving module, and the camera module to reciprocate in a direction parallel to the central axis of the driving shaft.

Further, the camera module includes a housing body with a hollow in a middle thereof and a camera unit provided in the housing body; the first drive unit includes a first motor, a first reduction gearbox connected to the first motor, and a gear transmission assembly transmissionally connected to the first reduction gearbox; the driving shaft includes a connection sleeve with one end fixedly connected to the bottom part of the housing body and a bearing whose inner ring is connected with the other end of the connection sleeve; the central part of the connection sleeve is provided with an external tooth matched with the gear transmission assembly; the supporting base includes a plurality of accommodation slots, a plurality of placement slots, and a plurality of mounting slots are formed in the dented area on the supporting base; the placement slots and the accommodation slots are both provided on the side of the supporting base facing the camera module; the mounting slot is located on a side of the supporting base away from the camera module, the mounting slot connects with the accommodation slot through the placement slot; the first motor is installed on the mounting slot through a first reduction gearbox; the gear transmission assembly is installed in the placement slot; the outer ring of the bearing is fixed in the accommodation slot; the first motor drives the connection sleeve to rotate through the first reduction gearbox and gear transmission assembly.

Further, the placement slot includes a first positioning groove and a second positioning groove; the second positioning groove and the accommodation slot are recessed in the first positioning groove; the gear transmission assembly includes a driving gear connected to the output of the first reduction gearbox, a driven gear meshed with the external tooth, a middle gear provided between the driving gear and the driven gear and a device at the fixing plate of the top part of the middle gear and driven gear; the fixing plate is installed in the first positioning groove; the driving gear, middle gear and driven gear are all located in the second positioning groove and the middle gear and driven gear are all rotatably connected with the fixing plate.

Further, a first through hole is provided on a side of the housing body facing the supporting base; an outer sidewall protruding from an end of the connection sleeve away from the bearing is provided with an annular protrusion; a second through hole is provided on the fixing plate, the connection sleeve is interference fit with the first through hole and the annular protrusion abuts on the outer periphery of the first through hole; the other end of the connection sleeve passes through the first through hole and the second through hole in sequence and is connected to the bearing.

Further, the camera system includes a cable and a through hole communicating with the accommodation slot provided on a side of the supporting base away from the camera module; wherein the connection sleeve is provided with an inner hole running through its central axis direction; the cable passes through the through hole and the inner hole in sequence and then extends into the housing body and is connected to the camera unit for forming gaps between the cable and the connection sleeve and the supporting base.

Further, the camera unit is a dual-camera.

Further, the supporting base includes a vertical arm connected at the bottom to the driving member and a lateral arm disposed laterally at the top of the vertical arm; the first driving unit is installed at the bottom part of the lateral arm, and the driving shaft is rotatably connected to the lateral arm.

Further, the second driving unit includes a second motor, a second reduction gearbox connected to the second motor and a transmission assembly connected to the second reduction gearbox; the driving member is a connecting frame and the second motor drives the driving member to move through the second reduction gearbox and the transmission assembly.

Further, the transmission assembly includes a fixing frame, a guiding bar, and a leading screw; the guiding bar and the leading screw are installed on the fixing frame in parallel at intervals; the driving member has a third through hole slidingly matched with the guiding bar and a threaded hole matched with the screw thread; the second motor drives the leading screw to rotate through a second reduction gearbox to drive the driving member to move in the axial direction of the leading screw.

Further, the first motor and the second motor are both stepping motors.

Further, the first reduction gearbox and the second reduction gearbox are both planetary reduction gearboxes.

The present invention further provides a mobile terminal using the camera system described above.

BRIEF DESCRIPTION OF THE DRAWINGS

Many aspects of the exemplary embodiment can be better understood with reference to the following drawings. The components in the drawing are not necessarily drawn to scale, the emphasis instead being placed upon clearly illustrating the principles of the present disclosure.

FIG. 1 is an illustrative and isometric view of a camera system provided by an embodiment of the present invention.

DETAILED DESCRIPTION OF THE EXEMPLARY EMBODIMENT

Figure 1:
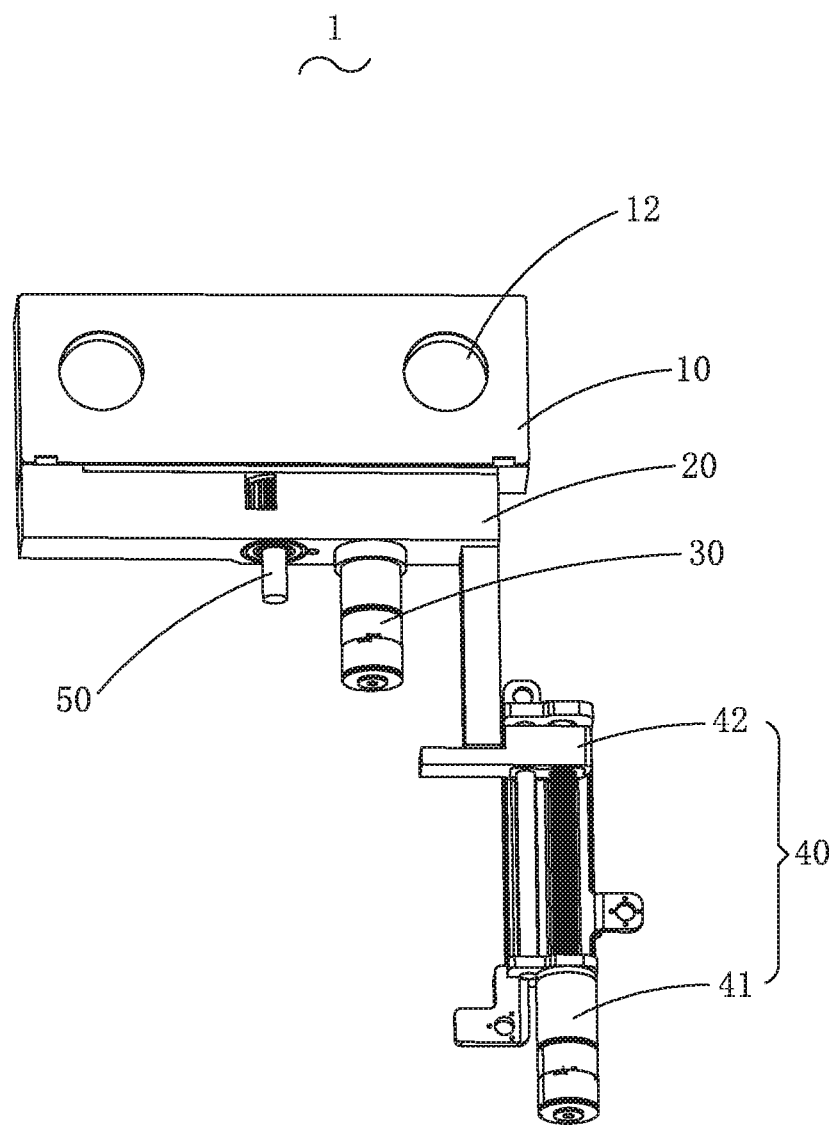

The present disclosure will hereinafter be described in detail with reference to an exemplary embodiment. To make the technical problems to be solved, technical solutions and beneficial effects of the present disclosure more apparent, the present disclosure is described in further detail together with the figure and the embodiment. It should be understood the specific embodiment described hereby is only to explain the disclosure, not intended to limit the disclosure.

It should be noted that all directional indicators (such as up, down, left, right, front, back, inside, outside, top part, bottom part . . . ) in the embodiment of the present invention are only used to explain in a certain posture (such as shown in the drawing) the relative positional relationship between the various components, etc. If the specific posture changes, the directional indication will also change accordingly.

It should also be noted that when an element is referred to as being "fixed" or "disposed" on another element, the element can be directly on the other element or there can be a centering element at the same time. When an element is said to "connect" another element, it may be directly connected to the other element or there may be a center element at the same time.

Please refer to FIGS. 1-9, a camera system 1 provided according to an embodiment of the present invention is used for installation in an accommodation space of a mobile terminal. The camera system 1 includes a camera module 10, a supporting base 20, a rotating driving module 30, and a mobile driving module 40.

In the present embodiment, the rotating driving module 30 and the mobile driving module 40 can respectively enable the camera module 10 to rotate, expand and contract.

Figure 3:
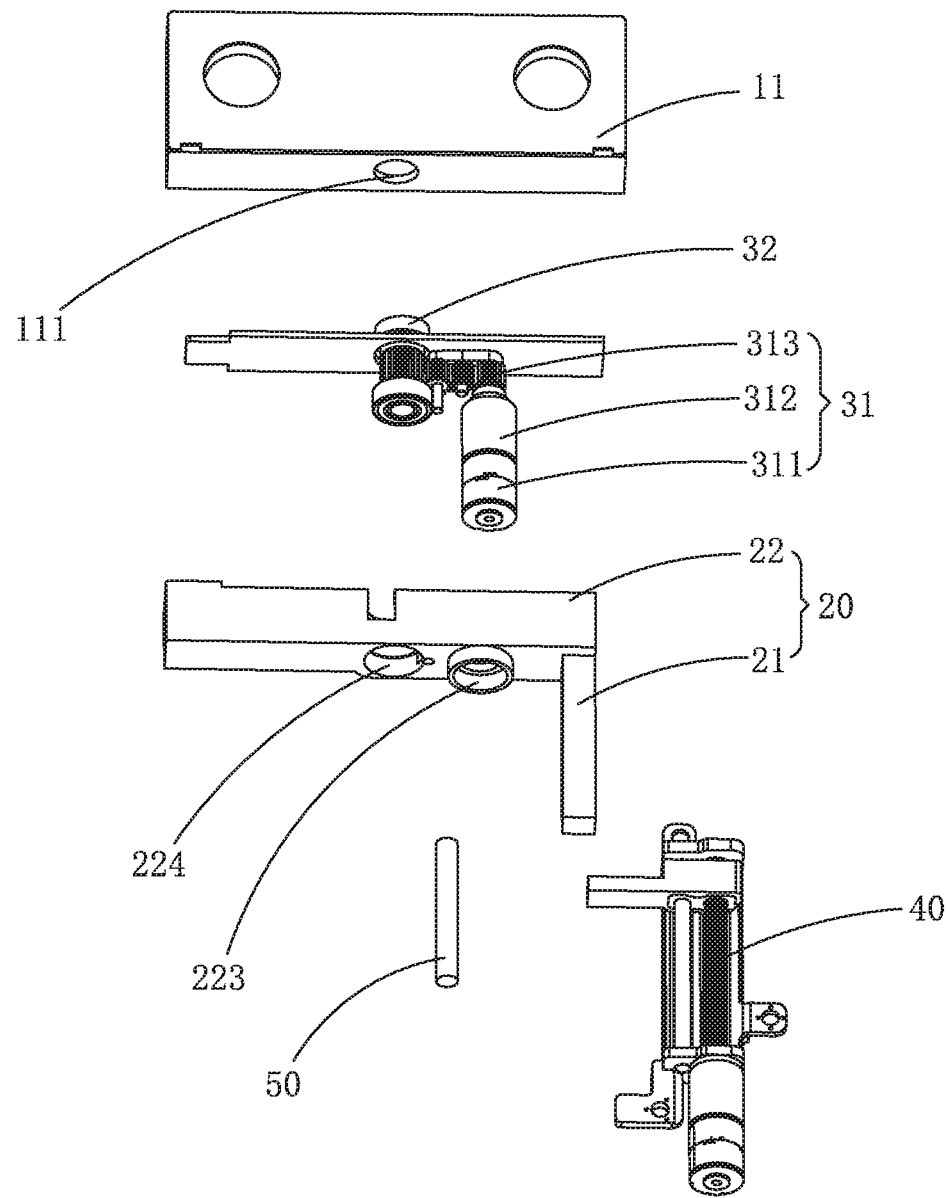
FIG. 3 is an exploded view of the camera system in FIG. 2, from another aspect.
Figure 4:
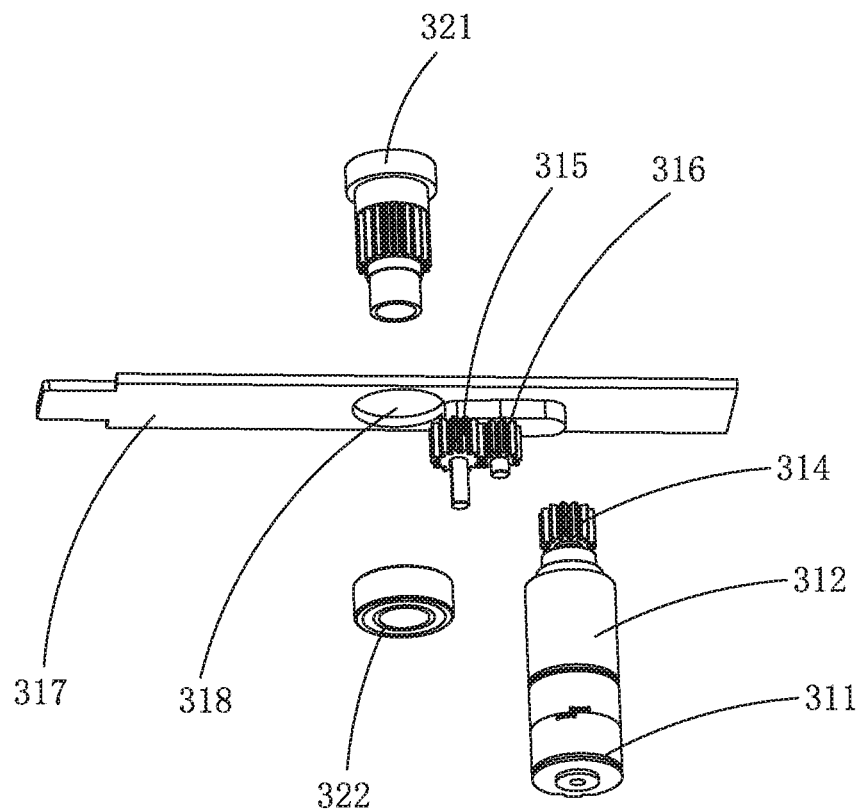
FIG. 4 is an exploded view of a rotary driving module provided by the embodiment of the present invention.

Please refer to FIGS. 3 and 4, a rotating working state will be described. The rotating driving module 30 is installed on the supporting base 20 for outputting the rotating power. The rotary driving module 30 includes a first driving unit 31 and a driving shaft 32 connected to the output of the first driving unit 31. The supporting base 20 includes a vertical arm 21 and a lateral arm 22 which is horizontally arranged on the top of vertical arm 21. The first driving unit 31 is installed at the bottom part of the lateral arm 22, and the driving shaft 32 is rotatably connected to the lateral arm 22. The camera module 10 is connected to the driving shaft 32. When the first driving unit 31 drives the driving shaft 32 to rotate, the driving shaft 32 can drive the camera module 10 to rotate around a central axis of the driving shaft 32.

Please refer to FIG. 6 further, a telescopic working state will be described. The mobile driving module 40 is used to provide a reciprocating driving force. The mobile driving module 40 includes a second driving unit 41 and a driving member 42 connected to the output of the second driving unit 41. The supporting base 20 is connected to the driving member 42 away from the end part of camera module 10 that is the bottom of vertical arm 21. When the second driving unit 41 drives the driving member 42 to move, the driving member 42 can drive the supporting base 20, the rotating driving module 30 and the camera module 10 to reciprocate in a direction parallel to the central axis of the driving shaft 32. Therefore it can realize the expansion and rotation of the camera module 10 relative to the accommodation space in the mobile terminal to meet the user's need for more shooting angles and easy usage.

Specifically, the first driving unit 31 includes a first motor 311, a first reduction gearbox 312 connected to the first motor 311 and a gear transmission assembly 313 drivingly connected to the first reduction gear box 312. The driving shaft 32 includes a connection sleeve 321 with one end fixedly connected to the bottom part of housing body 11 and a bearing 322 with an inner ring connected to the other end of the connection sleeve 321. The outer ring of bearing 322 is installed on supporting base 20. In the middle of the connection sleeve 321, there is an external tooth 323 matched with the gear transmission assembly 313, so that the first motor 311 drives the driving shaft 32 to rotate through the first reduction gearbox 312 and the gear transmission assembly 313, which in turn drives the camera module 10 to rotate. Preferably, the first motor 311 is a stepping motor, and the first reduction gearbox 312 is a planetary reduction gearbox.

Figure 2:
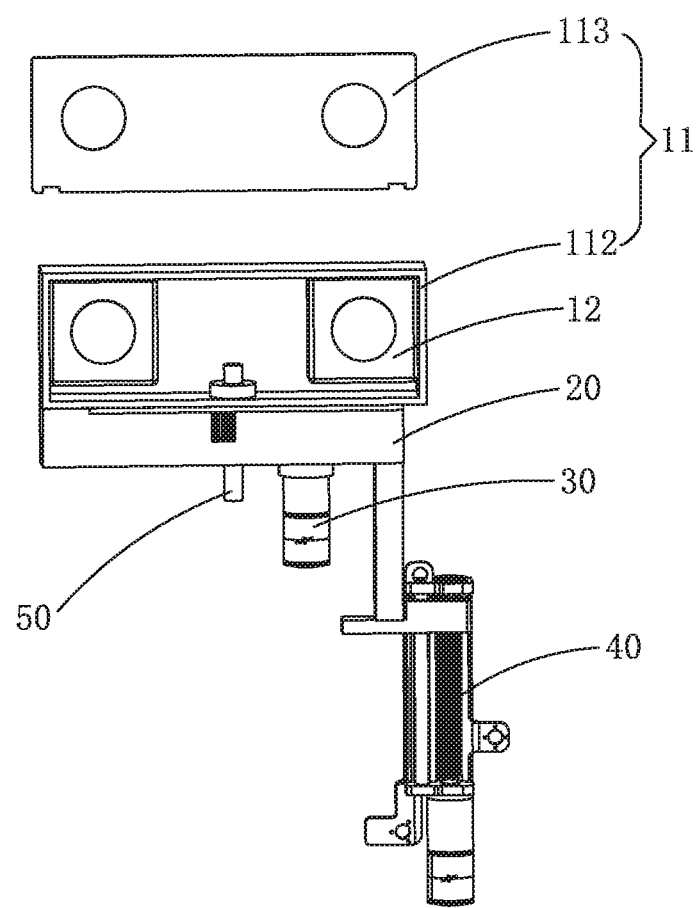
FIG. 2 is an exploded view of the camera system in FIG. 1, from one aspect.
Figure 5:
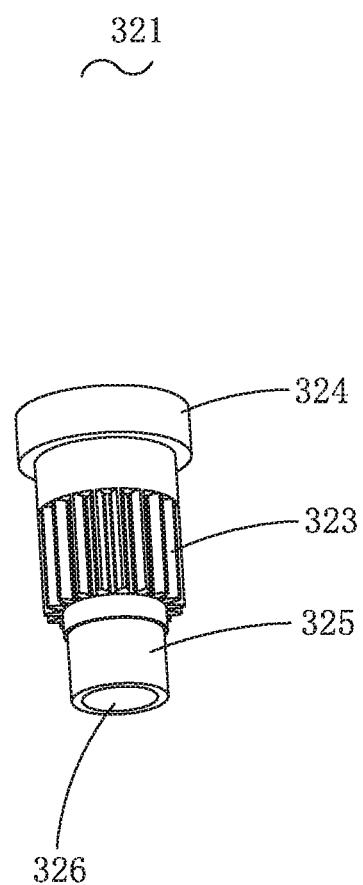
FIG. 5 is an illustrative structural view of a connection sleeve provided by the embodiment of the present invention.

Please refer to FIG. 2 and FIG. 5 for further information. Preferably, the camera module 10 includes a housing body 11 with a hollow interior and a camera unit 12 provided in the housing body 11. The housing body 11 has a first through hole 111 on the side facing the supporting base 20. The outer side wall of the end of the connection sleeve 321 away from the bearing 322 is convexly provided with an annular protrusion 324. The connection sleeve 321 has an interference fit with the first through hole 111 and the annular protrusion 324 abuts the outer periphery of the first through hole 111. The other end of the connection sleeve 321 is a cylindrical body 325, which is connected to the inner ring of bearing 322 with an interference fit. External tooth 323 is located in the middle of connection sleeve 321. The camera unit 12 in this embodiment is a dual camera and the two cameras are respectively disposed near the two ends of the housing body 11. Of course, in specific applications, the number and layout of cameras are not limited to what is described above. For example, there may be one or more cameras.

Preferably, the housing body 11 includes a bottom housing 112 and an upper cover 113 covering above the bottom housing 112. The camera unit 12 is installed in the accommodation space composed of bottom housing 112 and upper cover 113. The camera unit 12 is installed in the accommodation space composed by the bottom housing 112 and the upper cover 113. The connection sleeve 321 is fixedly connected to the bottom housing 112. The camera unit 12 is preferably an OIS camera (optical image stabilization camera).

Figure 7:
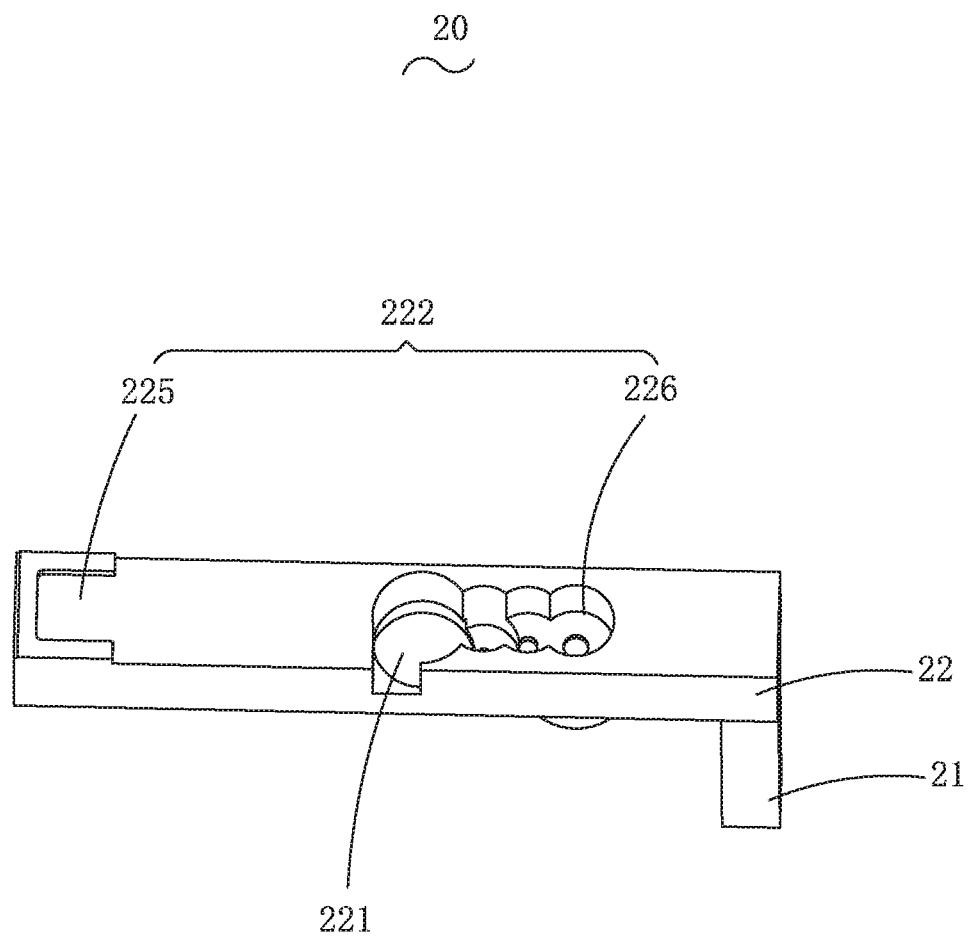
FIG. 7 is an illustrative structural view of a supporting base provided by the embodiment of the present invention.

Please refer to FIG. 7 for further information. The camera system 1 further includes a cable 50, a number of accommodation slot 221, a number of placement slot 222, a number of mounting slots 223, and a number of through holes 224 are formed on the supporting base 20. The placement slot 222 and the accommodation slot 221 are recessed on the side of supporting base 20 facing the camera module 10. Both through hole 224 and mounting slot 223 are recessed on the side of supporting base 20 away from camera module 10. The through hole 224 is linked with the accommodation slot 221. The mounting slot 223 is linked with accommodation slot 221 through placement slot 222. The first motor 311 is installed on the mounting slot 223 through the first reduction gearbox 312. The gear transmission assembly 313 is installed in the placement slot 222. The outer ring of bearing 322 is fixed in the accommodation slot 221 and the external tooth 323 also extends in the placement slot 221. The connection sleeve 321 is provided with an inner hole 326 which runs through its central axis direction. The cable 50 passes through the through hole 224 and the inner hole 326 in sequence and then extends into the housing body 11 and is connected to the camera unit 12. The cable 50 and connection the sleeve 321 and the supporting base 20 are all set in gaps to avoid friction damage of the cable 50 during the use of the camera system 1. The first motor 311 drives the connection sleeve 321 to rotate through the first reduction gearbox 312 and the gear transmission assembly 313.

Preferably, the gear transmission assembly 313 includes a driving gear 314 connected to the output of the first reduction gearbox 312, a driven gear 315 meshed with the external tooth 323, a middle gear 316 provided between the driving gear 314 and the driven gear 315, and a fixing plate 317 of the top part of the middle gear 316 and the driven gear 315. The placement slot 222 includes a first positioning groove 225 and a second positioning groove 226. Both the second positioning groove 226 and the accommodation slot 221 are recessed in the first positioning groove 225. The fixing plate 317 is installed in the first positioning groove 225. The driving gear 314, the middle gear 316 and the driven gear 315 are all located in the second positioning groove 226. And the middle gear 316 and the driven gear 315 are both rotationally connected with the fixing plate 317 so that the position of the middle gear 316 and the driven gear 315 can be positioned and the overall height of the camera system 1 can be reduced. The fixing plate 317 has a second through hole 318. The other end of the connection sleeve 321 passes through the first through hole 111 and the second through hole 318 in sequence and then is interference-connected with the inner ring of bearing 322.

Figure 6:
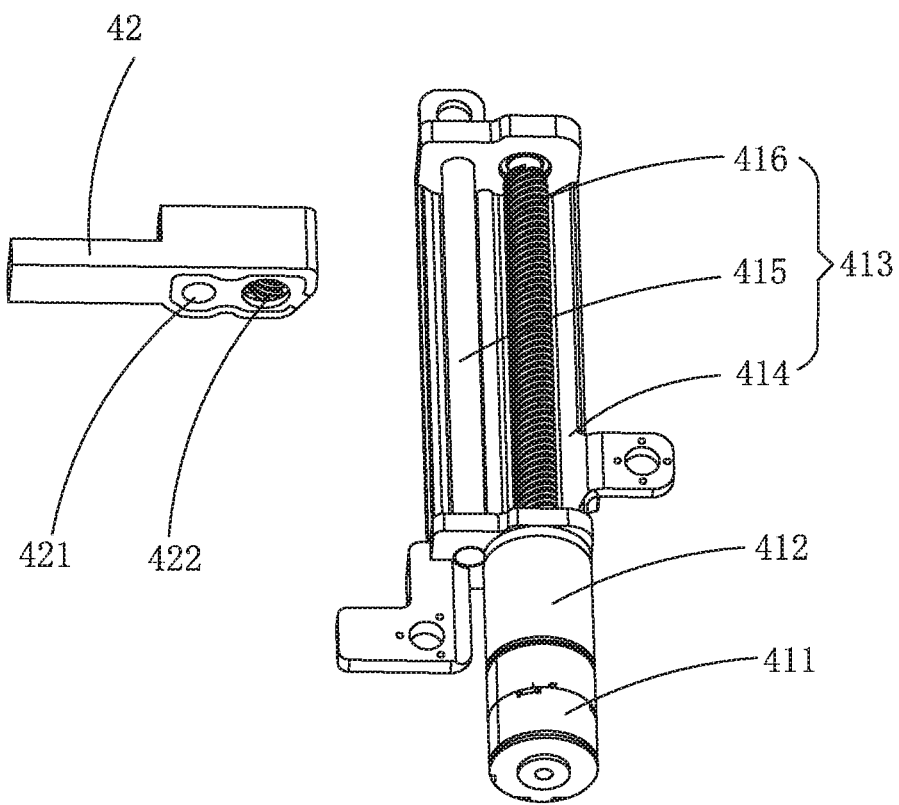
FIG. 6 is an exploded view of a mobile driving module provided by the embodiment of the present invention.

Please refer to FIG. 1 and FIG. 6. In the present invention, the second driving unit 41 includes a second motor 411, a second reduction gearbox 412 connected to the second motor 411, and a transmission assembly of the leading screw 413 drivingly connected to the second reduction gear box 412. The driving member 42 is a connecting frame. The second motor 411 drives the driving member 42 to move through the second reduction gearbox 412 and the transmission assembly 413. The transmission assembly 413 includes a fixing frame 414, a guiding bar 415 and a leading screw 416. The guiding bar 415 and the leading screw 416 are installed parallel to the fixing frame 414 at intervals. The driving member 42 has a third through the hole 421 slidingly matched with the guiding bar 415 and a threaded hole 422 threadedly matched with the leading screw 416. The guiding bar 415 can make the driving member 42 slide smoothly relative to the leading screw 416. The second motor 411 drives the leading screw 416 to rotate through the second reduction gearbox 412 to drive the driving member 42 to move in the axial direction of the leading screw 416. Preferably, the second motor 411 is a stepping motor and the second reduction gearbox 412 is a planetary reduction gearbox.

Figure 8:
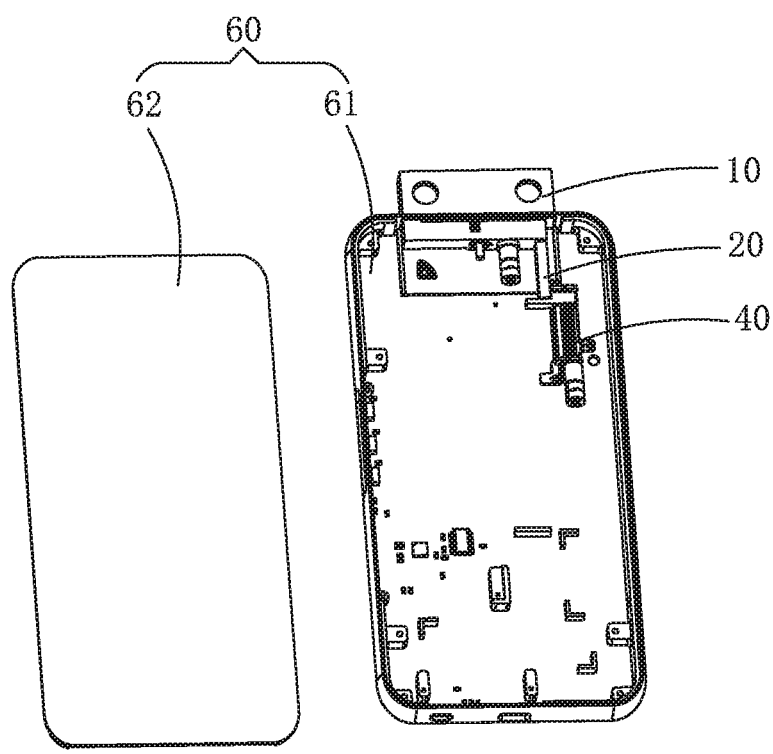
FIG. 8 is an exploded view of a mobile terminal of the present invention, from one aspect.
Figure 9:
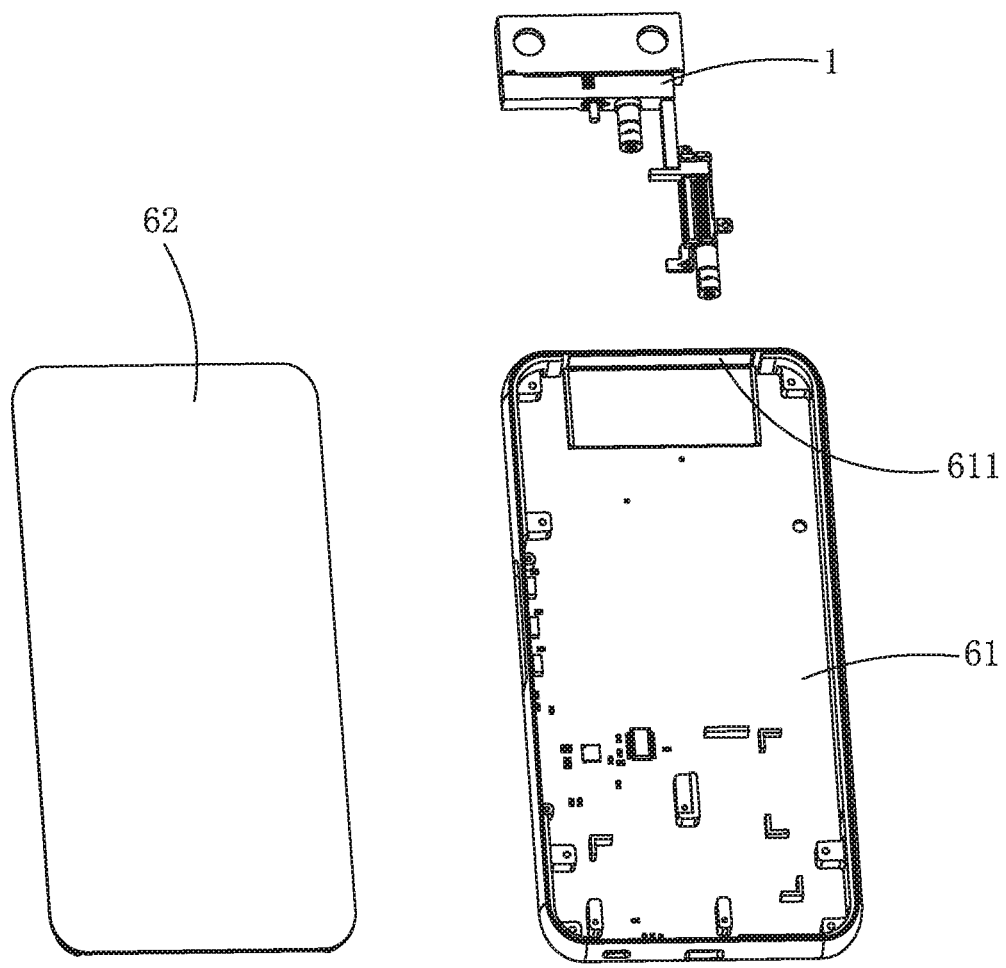
FIG. 9 is an exploded view of the mobile terminal in FIG. 8, from another aspect.

Please refer to FIG. 8 and FIG. 9. The invention also provides a mobile terminal, which includes a side frame 61, a covering plate 62 covered on the side frame 61 and jointly forming an accommodation space and a camera system 1 set in the accommodation space as described above. The side frame 61 has a through hole 611 passing therethrough. The camera module 10 is set opposite to the hole 611. The camera module 10 can be driven by the mobile driving module 40 to extend from the through hole 611 out of the accommodation space and retract into the accommodation space and when the camera module 10 is completely extended out of the accommodation space, the camera module 10 rotatable in a plane perpendicular to its extension direction to enable the camera module 10 to rotate and extend. Preferably, when the camera module 10 is retracted into the accommodation space, the top end of the camera module 10 and the through hole 611 are on the same plane so that the camera module 10 forms a package for the through hole 611 and is hidden in the accommodation space and the appearance of the mobile terminal has a complete structure and a better appearance.

A mobile terminal, including a side frame 61 and a covering plate 62 covered on the side frame 61 and forming an accommodation space together. The side frame 61 and the covering plate 62 constitute the housing 60 of the mobile terminal. The accommodation space is located in housing 60. The side frame 61 has a through hole 611. The mobile terminal also includes a camera module 10 installed in the accommodation space. The camera module 10 can be telescopically moved to extend from the through hole 611 to the side frame 61 and retract to the side frame 61. When the camera module 10 is fully extended to the side frame 61, the camera module 10 can be carried out in a plane perpendicular to its telescopic direction 360 degree rotation. In application, the mobile driving module 40 needs to first drive the camera module 10 to a predetermined position outside the accommodation space, and then drives the camera module 10 to rotate to a desired angle through the rotary driving module 30. Of course, in addition to the implementation method described above, a mechanical and/or other structure that can realize the telescopic rotation function can also be selected. The camera system 1 is not limited to the above structure and can be adjusted according to the actual structural needs. Preferably, in this embodiment, the mobile terminal is a smart phone. Understandably, the mobile terminal may also be a tablet computer or other mobile terminal with a camera function.

The control method of the mobile terminal of the present invention 1S:

The mobile terminal receives the control instruction and sends an execution instruction to the mobile driving module 40;

After the mobile driving module 40 receives the execution instruction, it drives the camera module 10 to move linearly to push the camera module 10 out of the housing 60 to a predetermined position and drive the camera module 10 to move linearly to push the camera module 10 out of the housing 60 to a predetermined position;

After the camera module 10 is pushed out to a predetermined position outside the housing 60, the mobile terminal receives the control command and sends an execution command to the rotary driving module 30. After receiving the execution instruction, the rotary driving module 30 drives the camera module 10 to rotate relative to the housing 60 to a predetermined angle and the predetermined angle is the shooting angle required by the user;

After the rotating driving module 30 drives the camera module 10 to rotate 180 degrees or rotate to the initial position, the mobile terminal receives the control instruction and sends an execution instruction to the mobile driving module 40;

After receiving the execution instruction, the mobile driving module 40 drives the camera module 10 to perform linear motion to drive the camera module 10 to contract within the housing 60.

The working principle of the mobile terminal of an embodiment of the present invention is that: when the camera module 10 is not launched with housing 60, the first motor 311 in the rotary driving module 30 and the second motor 411 in the mobile driving module 40 do not work. When the user needs to use the rear function of camera system 1, that is, the camera module 10 needs to be pushed out of housing 60, the mobile terminal receives the control command and sends an execution command to the mobile driving module 40. The first motor 311 does not work and the second motor 411 begins to work to release the camera module 10 from housing 60. When pushed to a predetermined position, the second motor 411 stops working so that the camera module 10 stops moving and the user can normally use the shooting function of the mobile terminal. When the user needs to use the front function of camera system 1, that is, to rotate camera module 10, the mobile terminal receives the control command and sends the execution command. First the camera module 10 should be launched from the housing 60 through the second motor 411. When pushed to a predetermined position, the second motor 411 will stop moving and the first motor 311 will work to drive the entire camera module 10 to rotate. When the camera module 10 rotates 180°, both the first motor 311 and the second motor 411 stop working so that the camera module 10 stops moving. At this time, the camera module 10 has a pre-function, which is convenient for users to use and also improves the experience effect. When it is not needed, the camera module 10 can be stored in the housing 60, which can prevent the camera module 10 from being damaged by external forces, improve the reliability of the mobile terminal and make the appearance of the mobile terminal more beautiful.

The mobile terminal in the present invention has the following application scenarios:

During normal shooting, the second motor 411 drives the camera module 10 straight up to the shooting position.

When in 360-degree panoramic shooting, the first motor 311 drives the camera module 10 to rotate at a low speed of 360 degrees. The OIS camera can compensate for the shaking of the hand and the camera module 10 during the rotation.

During the front-end shooting, the first motor 311 drives the camera module 10 to quickly rotate 180 degrees and the completion time is within 0.1 second.

During dynamic focusing and tracking of moving objects, the two cameras can analyze the angle of the moving object and the camera in real time. The first motor 311 action drives the camera to rotate and compensate to achieve real-time focusing of the moving object;

Shoot at any angle, the first motor 311 should be controlled to rotate to a specific angle. It can also shoot at any angle in the range of 360° without the need of turning human body when facing the screen, which is more convenient.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A camera system, comprising:
a supporting base;
a rotary driving module installed on the supporting base for outputting rotary power, including a first driving unit and a driving shaft connected to an output of the first driving unit for being driven by the first driving unit;
a camera module, connected to the driving shaft for being driven by the driving shaft to rotate around a central axis of the driving shaft;
a mobile driving module for providing reciprocating driving force, including a second driving unit and a driving member connected to an output of the second driving unit; wherein
the supporting base is connected to the driving member away from an end part of the camera module;
the second driving unit drives the driving member to move, so that the driving member drives the supporting base, the rotary driving module, and the camera module to reciprocate in a direction parallel to the central axis of the driving shaft;
the camera module includes a housing body with a hollow in a middle thereof and a camera unit provided in the housing body;
the first drive unit includes a first motor, a first reduction gearbox connected to the first motor, and a gear transmission assembly transmissionally connected to the first reduction gearbox;
the driving shaft includes a connection sleeve with one end fixedly connected to the bottom part of the housing body and a bearing whose inner ring is connected with the other end of the connection sleeve;
the central part of the connection sleeve is provided with an external tooth matched with the gear transmission assembly;
the supporting base includes a plurality of accommodation slots, a plurality of placement slots, and a plurality of mounting slots are formed on the supporting base; the placement slots and the accommodation slots are both provided on the side of the supporting base facing the camera module; the mounting slot is located on a side of the supporting base away from the camera module, the mounting slot connects with the accommodation slot through the placement slot;
the first motor is installed on the mounting slot through a first reduction gearbox;
the gear transmission assembly is installed in the placement slot; the outer ring of the bearing is fixed in the accommodation slot; the first motor drives the connection sleeve to rotate through the first reduction gearbox and gear transmission assembly.

2. The camera system as described in claim 1, wherein the placement slot includes a first positioning groove and a second positioning groove; the second positioning groove and the accommodation slot are recessed in the first positioning groove;

the gear transmission assembly includes a driving gear connected to the output of the first reduction gearbox, a driven gear meshed with the external tooth, a middle gear provided between the driving gear and the driven gear and a device at the fixing plate of the top part of the middle gear and driven gear;

the fixing plate is installed in the first positioning groove;

the driving gear, middle gear and driven gear are all located in the second positioning groove and the middle gear and driven gear are all rotatably connected with the fixing plate.

3. The camera system as described in claim 2, wherein a first through hole is provided on a side of the housing body facing the supporting base; an outer sidewall protruding from an end of the connection sleeve away from the bearing is provided with an annular protrusion; a second through hole is provided on the fixing plate, the connection sleeve is interference fit with the first through hole and the annular protrusion abuts on the outer periphery of the first through hole; the other end of the connection sleeve passes through the first through hole and the second through hole in sequence and is connected to the bearing.

4. The camera system as described in claim 1 further including a cable and a through hole communicating with the accommodation slot provided on a side of the supporting base away from the camera module; wherein the connection sleeve is provided with an inner hole running through its central axis direction; the cable passes through the through hole and the inner hole in sequence and then extends into the housing body and is connected to the camera unit for forming gaps between the cable and the connection sleeve and the supporting base.

5. The camera system as described in claim 1, wherein the camera unit is a dual-camera.

6. The camera system as described in claim 1, wherein the supporting base includes a vertical arm connected at the bottom to the driving member and a lateral arm disposed laterally at the top of the vertical arm; the first driving unit is installed at the bottom part of the lateral arm, and the driving shaft is rotatably connected to the lateral arm.

7. The camera system as described in claim 1, wherein the second driving unit includes a second motor, a second reduction gearbox connected to the second motor and a transmission assembly connected to the second reduction gearbox; the driving member is a connecting frame and the second motor drives the driving member to move through the second reduction gearbox and the transmission assembly.

8. The camera system as described in claim 7, wherein the transmission assembly includes a fixing frame, a guiding bar, and a leading screw; the guiding bar and the leading screw are installed on the fixing frame in parallel at intervals; the driving member has a third through hole slidingly matched with the guiding bar and a threaded hole matched with the screw thread; the second motor drives the leading screw to rotate through a second reduction gearbox to drive the driving member to move in the axial direction of the leading screw.

9. The camera system as described in claim 7, wherein the first motor and the second motor are both stepping motors.

10. The camera system as described in claim 7, wherein the first reduction gearbox and the second reduction gearbox are both planetary reduction gearboxes.

11. A mobile terminal, comprising:
a side frame;
a covering plate covered on the side frame and jointly forming an accommodation space;
a camera system as described in claim 1 disposed in the accommodation space; wherein
the side frame is provided with a through hole penetrating therethrough, and the camera module is opposite to the through hole;
the camera module can be driven by the mobile driving module to extend from the through hole to the outside of the accommodation space and retract into the accommodation space;
when the camera module is completely extended outside to the accommodation space, the camera module can rotate in a plane perpendicular to its telescopic direction.

12. The mobile terminal as described in claim 11, wherein when the camera module is retracted into the accommodation space, the top end of the camera module and the through hole are located on the same plane.

* * * * *